United States Patent
Diop et al.

(10) Patent No.: US 9,825,449 B2
(45) Date of Patent: *Nov. 21, 2017

(54) SIDE-LOADING STRAIGHT-LINE DEADEND CLAMP ASSEMBLY

(71) Applicant: Hubbell Incorporated, Shelton, CT (US)

(72) Inventors: Seydou Diop, Birmingham, AL (US); Paul Francis Zelazny, Moody, AL (US); Samuel Paul Reynolds, Pell City, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,411

(22) Filed: Jan. 29, 2016

(65) Prior Publication Data

US 2016/0181779 A1    Jun. 23, 2016

Related U.S. Application Data

(63) Continuation of application No. 13/410,430, filed on Mar. 2, 2012, now Pat. No. 9,263,871.

(51) Int. Cl.
*H02G 7/00* (2006.01)
*H02G 7/05* (2006.01)
*F16G 11/00* (2006.01)
*F16B 2/06* (2006.01)

(52) U.S. Cl.
CPC .............. *H02G 7/056* (2013.01); *F16B 2/065* (2013.01); *Y10T 24/3958* (2015.01); *Y10T 24/3967* (2015.01)

(58) Field of Classification Search
CPC .. H02G 7/056; H02G 7/05; F16L 3/02; Y10T 24/3967
USPC ........ 248/63, 65, 67.5, 67.7, 74.1; 24/135 R, 24/135 N, 132 R, 136 R, 489, 522; 174/169
See application file for complete search history.

(56) References Cited

U.S. PATENT DOCUMENTS

| | | | | |
|---|---|---|---|---|
| 4,707,051 A * | 11/1987 | Hall | ......................... | H01R 4/44 439/781 |
| 7,562,848 B2 * | 7/2009 | Tamm | .................... | H02G 7/056 24/65 |
| 9,263,871 B2 * | 2/2016 | Diop | ...................... | H02G 7/056 |

* cited by examiner

*Primary Examiner* — Tan Le
(74) *Attorney, Agent, or Firm* — Michael Best & Friedrich, LLP

(57) ABSTRACT

A clamp assembly includes a body member having a first and second ends. A cable groove is formed in the body member between the first and second ends thereof to receive a conductor. A keeper is connected to the body member and has a lower surface to engage the conductor received in the cable groove. A threaded fastener connects the keeper to the body member. A biasing member is disposed between the keeper and the body member on the threaded fastener to bias the keeper in a direction away from the body member.

19 Claims, 9 Drawing Sheets

SIDE-LOADING STRAIGHT-LINE DEADEND CLAMP ASSEMBLY

FIELD OF THE INVENTION

The present invention relates to a clamp assembly for deadending a conductor. More particularly, the present invention relates to a clamp assembly having a biasing member disposed between a keeper and body member of the clamp assembly. Still more particularly, the present invention relates to a clamp assembly in which a conductor is secured between a keeper and body member, and a biasing member is disposed on a fastener securing the keeper to the body member.

BACKGROUND OF THE INVENTION

Deadend clamps are commonly used to secure a cable under tension, for example, an overhead electrical conductor. The deadend clamp anchors the received cable to a supporting structure, such as a tower or utility pole. The deadend clamp transmits the tension on the cable to the supporting structure.

Conventional deadend clamps typically include one or more U-bolts to clamp a keeper, which in turn applies a clamping pressure to the conductor, such as the deadend clamp disclosed in U.S. Pat. No. 5,752,680. One disadvantage associated with such deadend clamps is that the lineman must remove several nuts and washers to insert the conductor, and then the nuts and washers must be reconnected to the U-bolts. That procedure becomes even more difficult when the lineman is working with an energized conductor in the field. Accordingly, a need exists for a clamp assembly that easily clamps and unclamps a conductor.

Another disadvantage associated with conventional deadend clamps is the use of non-captive fasteners to secure the keeper to the main body. Non-captive fasteners are prone to loosening, thereby providing a less secure connection between the keeper and the main body. Accordingly, a need exists for a clamp assembly in which the keeper is securely connected to the main body to maintain clamping pressure on the conductor.

Still another disadvantage associated with conventional deadend clamps is the use of external springs between the keeper and the main body. These springs can become dislodged when tightening the keeper to the main body. Additionally, these springs require the fasteners to be tightened in a specific sequence to prevent damaging the springs, thereby providing an inefficient and time consuming task for the lineman. Accordingly, a need exists for a clamp assembly having an improved biasing member between the keeper and main body.

SUMMARY OF THE INVENTION

Accordingly, it is a primary objective of the present invention to provide a clamp assembly that easily clamps and unclamps a conductor.

A further objective of the present invention is to provide a clamp assembly in which a keeper is securely connected to a main body.

Another objective of the present invention is to provide a clamp assembly in which a biasing member is securely maintained between a keeper and a main body.

The foregoing objectives are basically attained by a clamp assembly including a body member having a first and second ends. A cable groove is formed in the body member between the first and second ends thereof to receive a conductor. A keeper is connected to the body member and has a lower surface to engage the conductor received in the cable groove. A threaded fastener connects the keeper to the body member. A biasing member is disposed between the keeper and the body member on the threaded fastener.

The foregoing objectives are also basically attained by a clamp assembly including a body member having first and second ends and a substantially linear cable groove formed therebetween to receive a conductor. A keeper has a lower surface to engage the conductor received in the cable groove. A threaded fastener connects the keeper to the body member. An internally threaded nut disposed in a chamber in the keeper receives the fastener. A biasing member is disposed on the fastener.

Other objects, advantages and salient features of the invention will become apparent from the following detailed description, which, taken in conjunction with the annexed drawings, discloses a preferred embodiment of the invention.

As used in this application, the terms "front," "rear," "upper," "lower," "upwardly," "downwardly," and other orientational descriptors are intended to facilitate the description of the clamp assembly, and are not intended to limit the structure of the clamp assembly to any particular position or orientation.

BRIEF DESCRIPTION OF THE DRAWINGS

The above aspects and features of the present invention will be more apparent from the description for an exemplary embodiment of the present invention taken with reference to the accompanying drawings, in which.

Throughout the drawings, like reference numerals will be understood to refer to like parts, components and structures.

DETAILED DESCRIPTION OF EXEMPLARY EMBODIMENTS

Figure 1:
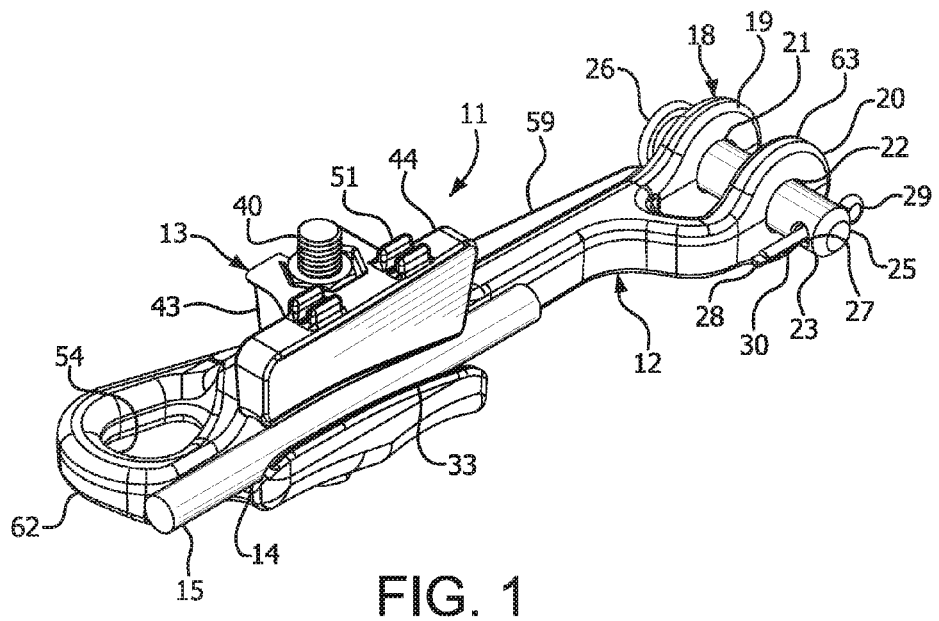
FIG. 1 is a perspective view of a side loading straight-line deadend clamp assembly according to an exemplary embodiment of the present invention prior to clamping a conductor.

As shown in FIGS. 1-21, a clamp assembly 11 includes a body member 12 and a keeper 13. The body member 12 has a cable groove 14 formed therein to receive a member 15, such as a conductor or cable. The keeper 13 is connected to the body member 12 and has a lower surface 16 adapted to engage the conductor 15 received in the cable groove 14. A biasing member 17 is disposed between the keeper 13 and the body member 12 and biases the keeper 13 in a direction away from the body member 12.

Figure 2:
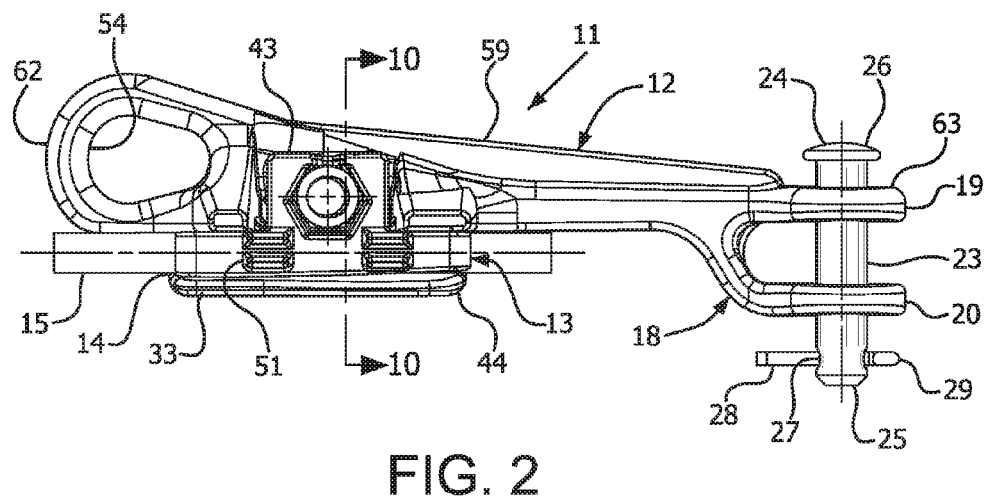
FIG. 2 is a top plan view of the clamp assembly of FIG. 1.
Figure 3:
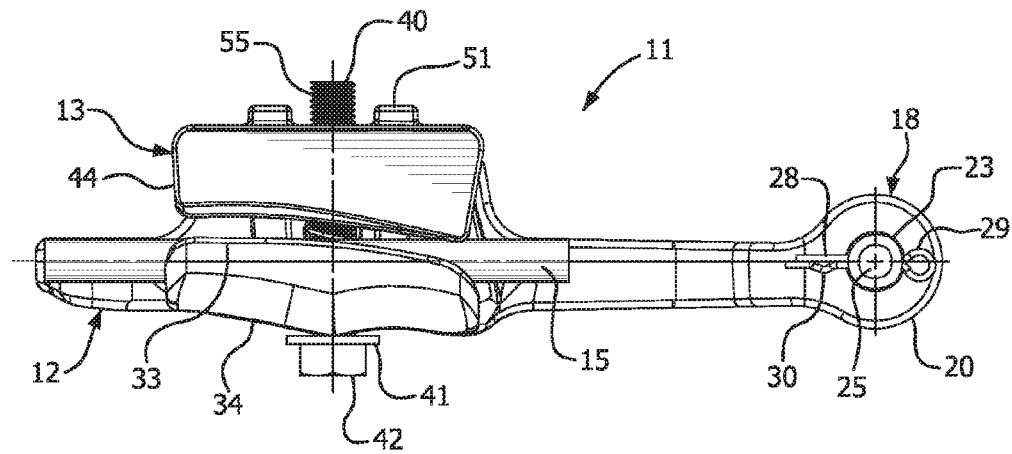
FIG. 3 is a front elevational view of the clamp assembly of FIG. 1.

The body member 12 has first and second ends 62 and 63, as shown in FIGS. 1 and 2. An eye 54 is disposed at the first end 62 of the body member 12. A clevis bracket 18 is disposed at the second end 63 and has first and second mounting ears 19 and 20, as shown in FIGS. 1 and 2. Openings 21 and 22 in the mounting ears 19 and 20 receive a clevis pin 23. As shown in FIG. 2, the clevis pin 23 has a first end 24 and a second end 25. A head 26 is disposed at the first end 24 of the clevis pin 23. An opening 27 is formed proximal the second end 25 of the clevis pin 23. The second end 25 of the clevis pin 23 is inserted through the first and second mounting ears 19 and 20. A cotter pin 28 is inserted through the opening 27 in the clevis pin 23, thereby preventing the clevis pin 23 from being removed from the mounting ears 19 and 20, as shown in FIGS. 2 and 3. The head 26 of the clevis pin 23 is larger than the openings 21 and 22 in the mounting ears 19 and 20 to limit insertion of the clevis pin 23 through the openings 21 and 22 in the mounting ears 19 and 20. The cotter pin 28 has a head 29 at one end and a raised portion 30 proximal the other end to substantially prevent accidental withdrawal of the cotter pin from the clevis pin opening 27. The head 29 of the cotter pin 28 is larger than the clevis pin opening 27 to limit insertion of the cotter pin 28. The raised portion 30 of the cotter pin 28 flexes to allow insertion of the cotter pin 28 through the clevis pin opening 27, but prevents accidental withdrawal of the cotter pin 28 from the clevis pin opening 27. The clevis bracket 18 allows the clamp assembly 11 to be pivotally connected to a supporting structure.

Figure 11:
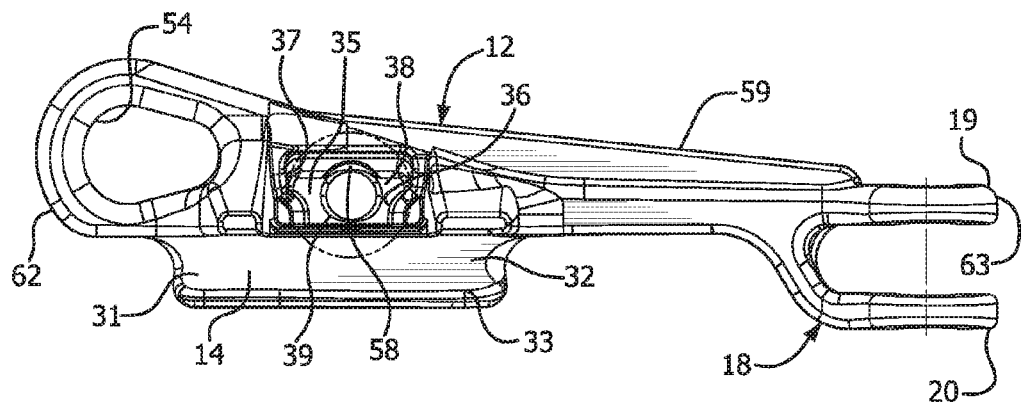
FIG. 11 is a top plan view of a body member of the keeper assembly of FIG. 1.

The cable groove 14 of the body member 12 has a first end 31 and a second end 32, as shown in FIG. 11, and is disposed between the first and second ends 62 and 63 of the main body 12. The cable groove 14 extends preferably in a substantially straight line, i.e., substantially linear, as shown in FIG. 3, to bring the conductor 15 in line with the clevis bracket 18. The cable groove 14 is preferably formed in a side of the body member 12 such that the conductor 15 can be inserted in the cable groove in a radial direction of the conductor, i.e., from the side of the clamp assembly 11. The cable groove 14 has a contour substantially similar to that of the keeper cable groove 16 to facilitate gripping the conductor 15 therebetween. A lip 33 is formed at an outer edge of the cable groove 14, as shown in FIGS. 1 and 3, to substantially prevent the conductor 15 from exiting the cable groove 14 before being clamped between the body member 12 and the keeper 13. The bottom surface 34 of the cable groove 14 is preferably substantially V-shaped, as shown in FIG. 3.

Figure 9:
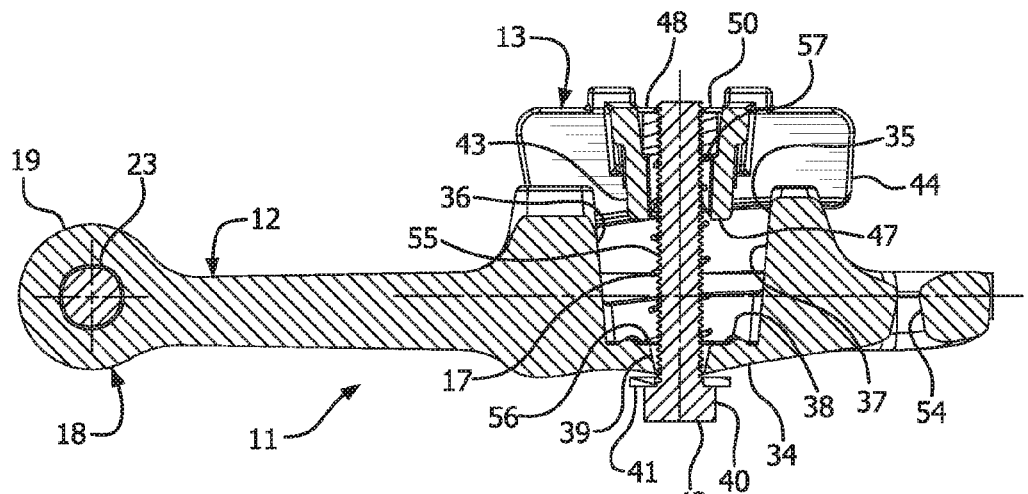
FIG. 9 is a rear elevational view in cross section taken along the line 9-9 of FIG. 8.
Figure 12:
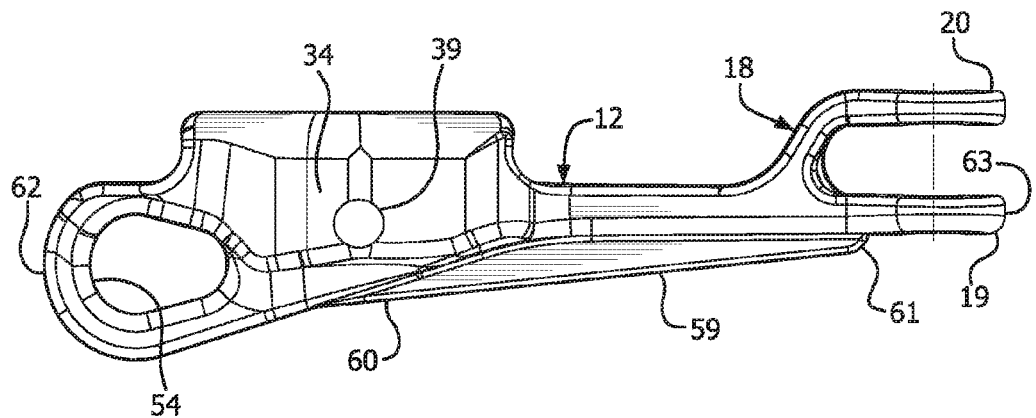
FIG. 12 is a bottom plan view of the body member of FIG. 11.
Figure 13:
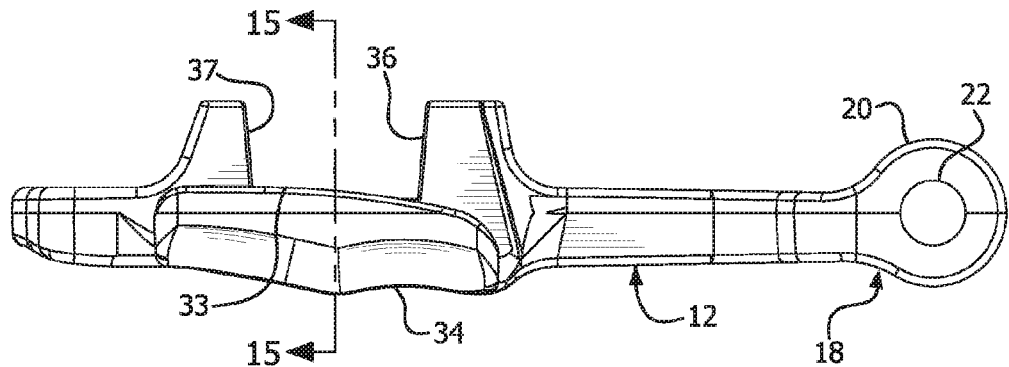
FIG. 13 is a front elevational view of the body member of FIG. 11.
Figure 14:
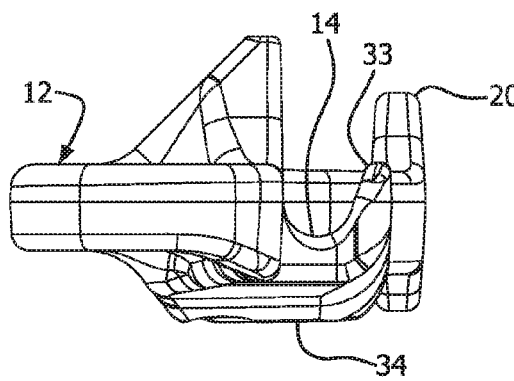
FIG. 14 is a left side elevational view of the body member of FIG. 11.
Figure 15:
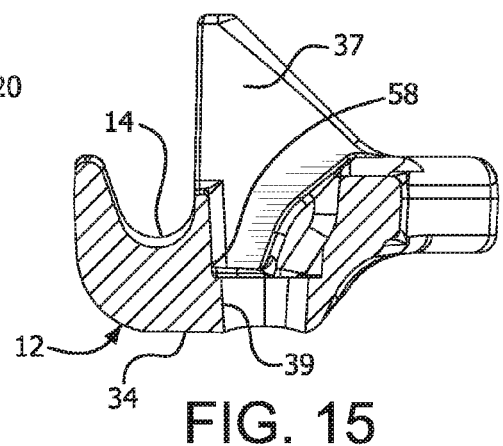
FIG. 15 is a right side elevational view in cross section of the body member taken along line 15-15 of FIG. 13.

As shown in FIGS. 9 and 11, a pocket 35 is formed in the body member 12 proximal the cable groove 14. The pocket 35 receives the keeper 13, as shown in FIGS. 2 and 11. The pocket 35 has opposite side walls 36 and 37 and a bottom wall 38 therebetween. A fastener opening 39 in the bottom wall 38 of the pocket 35 receives a fastener 40 to secure the keeper 31 to the body member 21, as shown in FIG. 9. The fastener opening 39 is entirely bounded by the bottom wall 38 of the pocket 35, as shown in FIGS. 11 and 12. The fastener opening 39 preferably tapers inwardly from the bottom wall 38 of the pocket 35 to the bottom surface 34, as shown in FIG. 9. Preferably, the fastener opening 39 has a substantially oval shape, as shown in FIG. 11.

Figure 5:
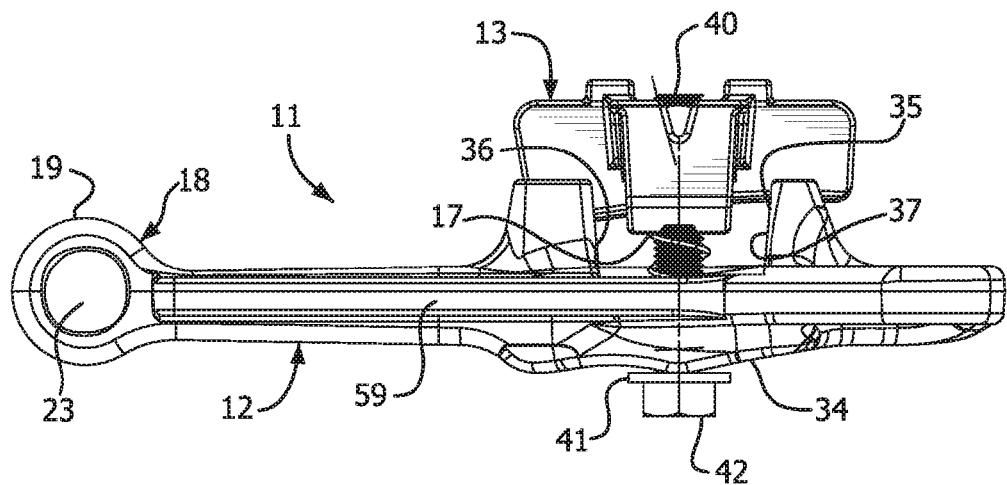
FIG. 5 is a rear elevational view of the clamp assembly of FIG. 1.

A washer 41 on the fastener 40 is disposed between a head 42 of the fastener and the bottom surface 34 of the body member 12, as shown in FIGS. 5 and 9. The portion of the bottom surface 34 of the body member 12 that receives the washer 42 preferably does not have a recessed portion to receive the washer. Preferably, the bottom surface 34 of the body member 12 is substantially V-shaped to allow the keeper 13 to freely rock sideways during installation due to the smaller seating surface for the washer 41. The sideways motion of the keeper 13 facilitates clamping the conductor 15 by allowing the keeper 13 to adjust to the form of the conductor 15, e.g., bowed or straight.

A rib 59 extends outwardly from a side of the body member 12 opposite the cable groove 14 and between the first and second ends 62 and 63, as shown in FIGS. 2, 11 and 12. The rib has a first end 60 proximal the eye 54 of the body member 12 and a second end 61 proximal the clevis bracket 18. The rib 59 structurally reinforces the body member 12.

Figure 10:
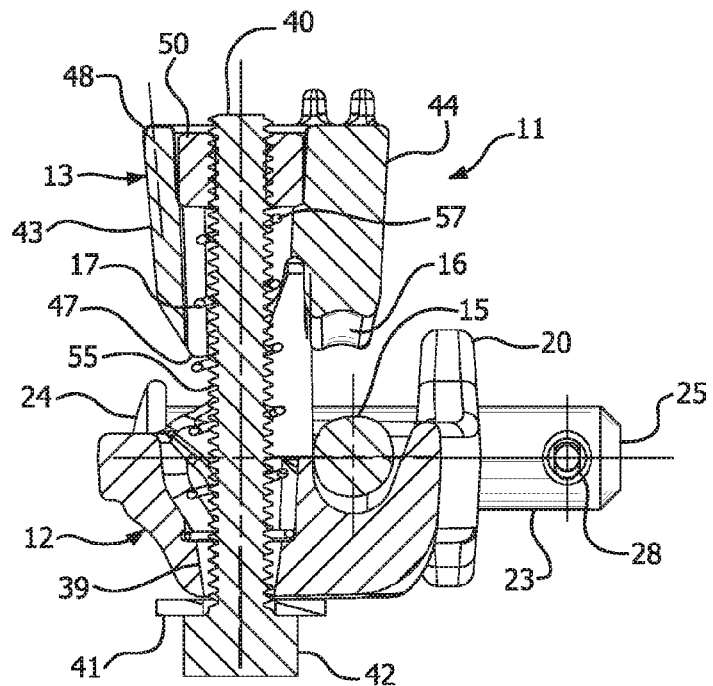
FIG. 10 is a left side elevational view in cross section of the clamp assembly taken along line 10-10 of FIG. 2.
Figure 17:
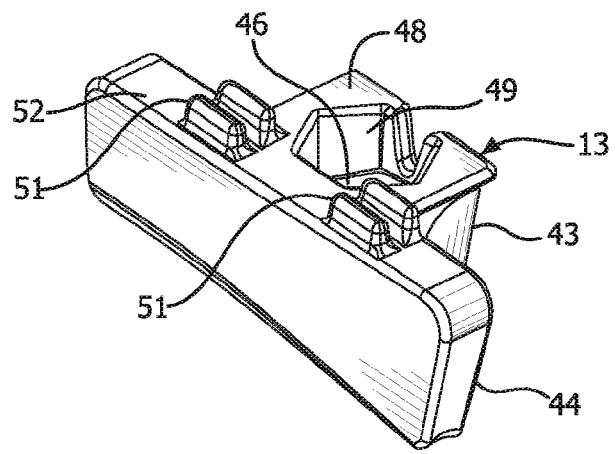
FIG. 17 is a perspective view of a keeper of the clamp assembly of FIG. 1.
Figure 18:
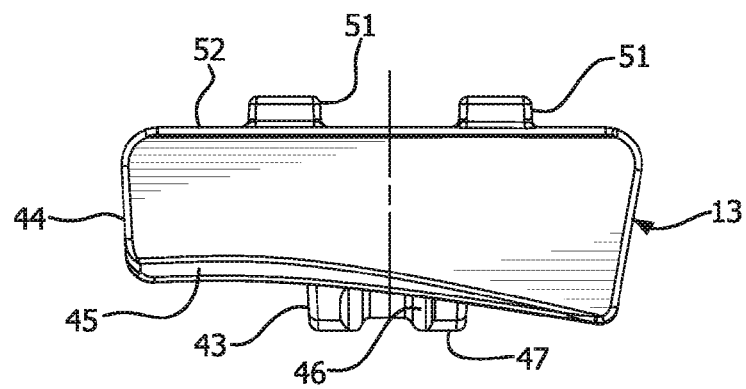
FIG. 18 is a front elevational view of the keeper of FIG. 17.
Figure 19:
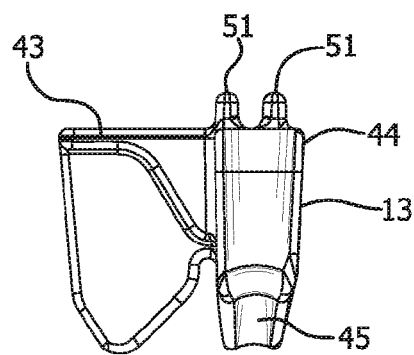
FIG. 19 is a left side elevational view of the keeper of FIG. 17.
Figure 20:
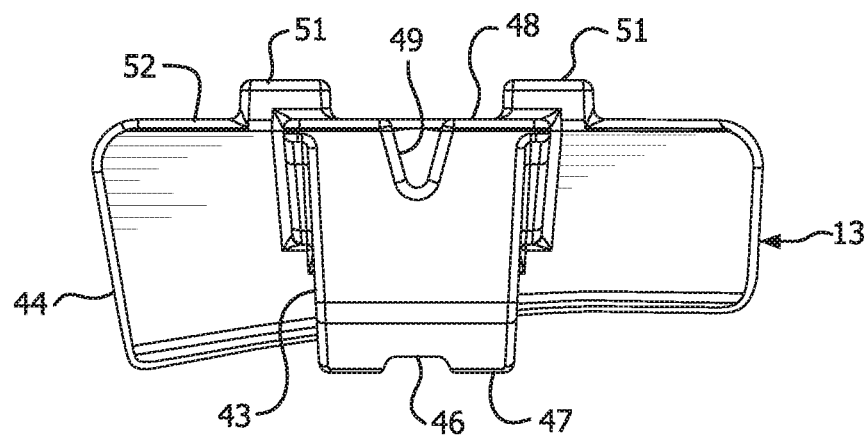
FIG. 20 is a rear elevational view of the keeper of FIG. 17.
Figure 21:
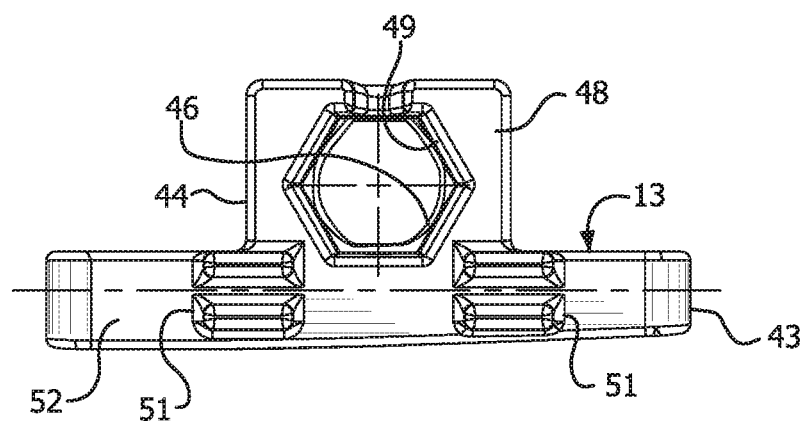
FIG. 21 is a top plan view of the keeper of FIG. 17.

The keeper 13 is secured to a side of the body member 12 adjacent the cable groove 14, as shown in FIGS. 1, 2 and 11. The keeper 13 has a fastening portion 43 and a cable engaging portion 44, as shown in FIGS. 17-21. A cable groove 45 is disposed in the cable engaging portion 44 of the keeper 13, as shown in FIGS. 10, 18 and 19. The keeper cable groove 45 is disposed opposite the body member cable groove 14 to securely retain the conductor 15 therebetween when the keeper 13 is secured to the body member 12.

Figure 4:
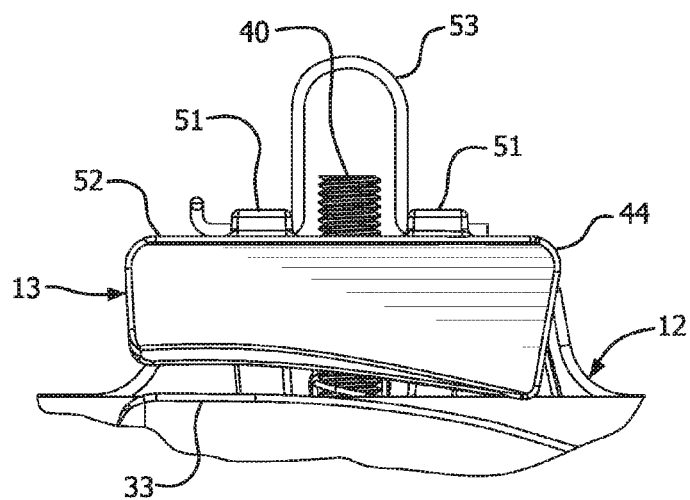
FIG. 4 is a partial front elevation view of a keeper of FIG. 3 with a lifting eye connected thereto.

The fastening portion 43 of the keeper 13 has a fastener bore 46 passing from an inner surface 47 to an outer surface 48 thereof, as shown in FIGS. 9 and 10. A chamber 49 is formed at the end of the bore proximal the outer surface 48 to receive a nut 50 disposed on the fastener 40. The chamber 49 is preferably hexagonally shaped to correspond to the outer shape of the nut 50, thereby providing a captive nut that is substantially prevented from rotational movement on the fastener 40. A plurality of protrusions 51 extend upwardly from an upper surface 52 of the cable engaging portion 44 of the keeper 13, as shown in FIGS. 17-19. A lifting eye 53 can be connected to the plurality of protrusions 51, as shown in FIG. 4, to facilitate manipulation of the clamp assembly 11.

The eye 54 disposed at the first end 60 of the body member 12, as shown in FIGS. 1 and 2, facilitates manipulation of the clamp assembly 11 by a lineman. Preferably, the eye 54 has a substantially oval shape. A majority of the cable groove 14 preferably runs between the eye 54 and the mounting ears 19 and 20, as shown in FIG. 11.

The fastener 40 is inserted through the fastener opening 39 in the bottom surface 34 of the body member 12 and is received by a fastener bore 46 in the keeper 13, as shown in FIGS. 9 and 10. The fastener 40 has a head 42 and a threaded shaft 55 extending therefrom. The washer 41 and the nut 50 are disposed on the fastener shaft 55. When assembled, the washer 41 is received by the bottom surface 34 of the body member 21, which is preferably substantially V-shaped as shown in FIG. 9, and the nut 50 is received in the chamber 49 in the fastener portion 43 of the keeper 13 to prevent relative rotation of the nut 50 and the keeper 13.

Figure 16:
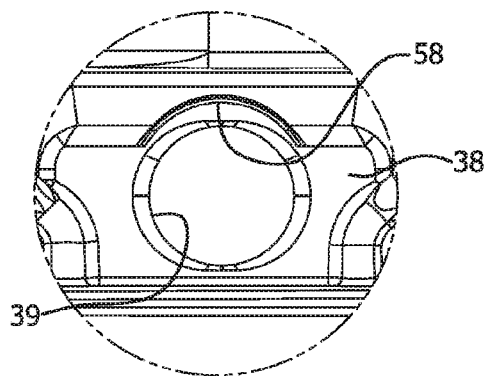
FIG. 16 is an enlarged top plan view of an opening in the body member of FIG. 11.

The biasing member 17 is disposed on the shaft 55 of the fastener 40, as shown in FIGS. 9 and 10. The biasing member 17 has a first end 56 that abuts the bottom wall 38 of the pocket 35. A counterbore 58 is formed around the fastener opening 39 in the bottom wall 38 of the pocket 35 to facilitate receiving the first end 56 of the biasing member 17, as shown in FIGS. 11 and 16. A second end 57 of the biasing member 17 abuts the nut 50 received in the chamber 49 of the keeper 13. The biasing member 17 is preferably a helical tapered spring in which a diameter at the first end 56 is larger than a diameter at the second end 57.

The body member 12 is preferably unitarily formed as a single-piece. The body member 12 is preferably made of an aluminum alloy. The keeper 13 is preferably unitarily formed as a single-piece. The keeper 13 is preferably made of an aluminum alloy.

Assembly and Operation

The deadend clamp assembly 11 is shown assembled in FIGS. 1-10. The body member 12 is connected to a support, such as a bracket, and the clevis pin 23 is passed through the mounting ear openings 21 and 22. The cotter pin 28 is then passed through the opening 27 in the clevis pin 23 to prevent the cotter pin 28 from being removed from the mounting ears 19 and 20. The clevis pin 23 allows the clamp assembly 11 to pivot with respect to the support, thereby facilitating receiving the conductor 15.

The conductor 15 is inserted in the cable groove 14 from a side of the body member (i.e., in a radial direction of the conductor) with the clamp assembly in an open position, as shown in FIG. 1. The lip 33, as shown in FIGS. 1-3, prevents the conductor 15 from slipping out of the cable groove 14 as the fastener 40 is tightened to draw the keeper 13 closer to the body member 12 to clamp the conductor 15 therebetween.

Figure 6:
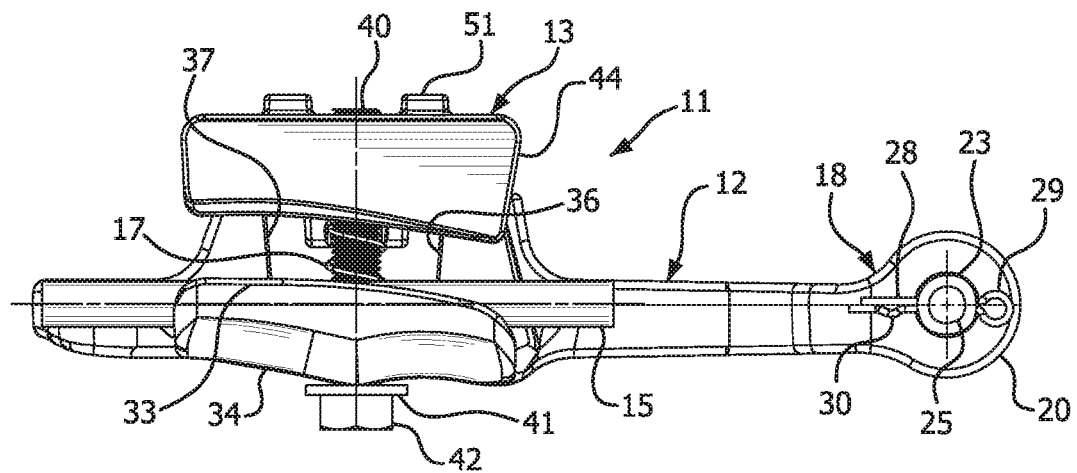
FIG. 6 is a front elevational view of the clamp of FIG. 3 in which the keeper is further spaced from a received conductor.
Figure 7:
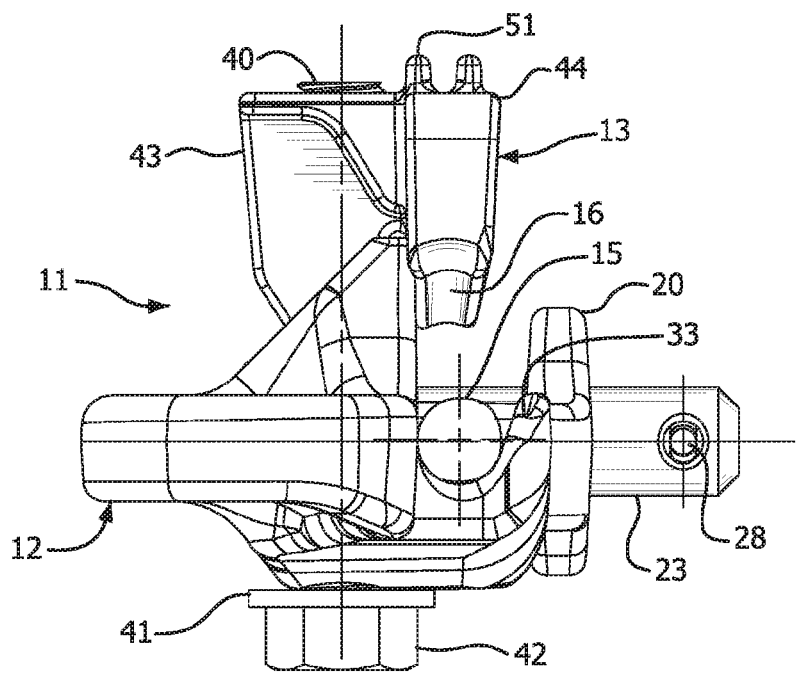
FIG. 7 is a left side elevational view of the clamp assembly of FIG. 1.
Figure 8:
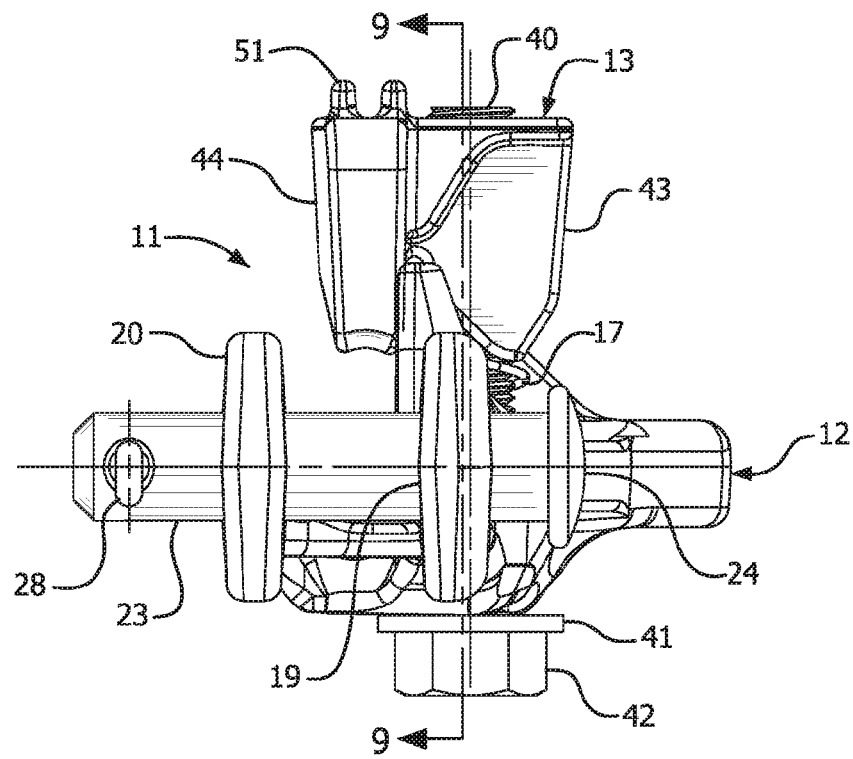
FIG. 8 is a right side elevational view of the clamp assembly of FIG. 1.

The washer 41 is disposed on the shaft 55 of the fastener 40 such that the washer 41 is received by the bottom outer surface 34 of the cable groove 14 of the body member 12, as shown in FIGS. 3, 5 and 6. To clamp the conductor 15 between the body member 12 and the keeper 13, the fastener 40 is inserted through the fastener opening 39 in the body member 12 and through the bore 46 in the keeper 13. The nut 50 is disposed in the chamber 49 of the fastener portion 43 of the keeper 13 and peened in the chamber 49 to substantially prevent upward (axial) movement.

The biasing member 17 is disposed on the shaft 55 of the fastener 40 such that the biasing member 17 is prevented from being dislodged during tightening. The fastener 40 is tightened, thereby drawing the fastener portion 43 of the keeper 13 into the pocket 35 of the body member 12 to clamp the conductor 15. The biasing member 17 is compressed as the fastener portion 43 of the keeper 13 is drawn into the pocket 35. Simultaneously, the cable portion 44 of the keeper 13 is drawn toward the retained conductor 15 in the cable groove 14. Tightening by rotation of the fastener 40 is stopped when the keeper cable groove 16 engages the conductor 15, thereby clamping the conductor 15 between the keeper 13 and the body member 12. The substantially V-shaped bottom surface 34 of the body member 12 allows the keeper 13 to freely rock sideways when tightening the fastener 40 such that the keeper 13 adjusts to the form of the conductor 15, e.g., bowed or straight, thereby enhancing the grip on the conductor 15. The chamber 49 and the peened nut 50 substantially prevent rotation and movement of the captive nut 50 on the fastener shaft 55, thereby securely retaining the keeper 13 to the body member 12. As shown in FIGS. 5, 6 and 9, the side walls 36 and 37 substantially prevent rotation of the keeper 13 relative to the body member 12 as the keeper 13 is drawn into the pocket 35 of the body member 12. Accordingly, the loosening by rotation of the fastener 40 unclamps the conductor 15 without having to remove parts of the clamp assembly 11.

While an advantageous embodiment has been chosen to illustrate the invention, it will be understood by those skilled in the art that various changes and modifications may be made therein without departing from the scope of the invention as defined in the appended claims.

What is claimed is:

1. A clamp assembly, comprising:
a body member having first and second ends;
a keeper connected to the body member having a surface to engage a conductor and a chamber;
a fastener connecting the keeper to the body member;
a coil spring disposed between the keeper and the body member around the threaded fastener biasing the keeper away from the body member; and
a nut disposed in the chamber receiving the fastener, wherein the chamber has a shape corresponding to the nut to substantially prevent rotational and axial movement of the nut therein.

2. The clamp assembly of claim 1, wherein
the body includes a substantially linear cable groove receiving the conductor.

3. The clamp assembly of claim 1, wherein
the coil spring is a helical tapered coil spring.

4. The clamp assembly of claim 1, wherein
a washer on the fastener abuts a substantially V-shaped outer surface of the body member.

5. The clamp assembly of claim 1, wherein
the body member includes a substantially oval shaped fastener opening.

6. A clamp assembly, comprising:
a body member having first and second ends;
a cable groove formed in the body member;
a keeper configured to engage a conductor received in the cable groove having an upper surface with a plurality of upwardly extending protrusions;
a threaded fastener connecting the keeper to the body member;
an internally threaded nut disposed in a chamber in the keeper receiving the fastener; and
a biasing member biasing the keeper away from the body member.

7. The clamp assembly of claim 6, wherein
the nut is fixed in the chamber and the chamber has a shape corresponding to the nut to substantially prevent rotational and axial movement of the nut therein.

8. The clamp assembly of claim 6, wherein
a washer on the fastener abuts an outer surface of the body member.

9. The clamp assembly of claim 8, wherein
the outer surface of the body member abutted by the washer is substantially V-shaped to facilitate movement of the keeper during installation.

10. The clamp assembly of claim 6, wherein
the biasing member includes a coil spring.

11. The clamp assembly of claim 10, wherein
the first end of the coil spring abuts the body member and the second end abuts the nut.

12. The clamp assembly of claim ii, wherein
a fastener opening in the body member receiving the fastener is substantially oval shaped.

13. The clamp assembly of claim 12, wherein
a counterbore is formed around the fastener opening to receive the first end of the coil spring.

14. The clamp assembly of claim 6, wherein
the coil spring has a first end and a second end coaxial with the fastener.

15. The clamp assembly of claim 6, wherein
the plurality of protrusions are connectable to a lifting eye.

16. A clamp assembly, comprising:
a body member having a first end, a second end, and a fastener opening;
a cable groove formed in the body member to receive a conductor;
a keeper connected to the body member to engage the conductor received in the cable groove;
a fastener connecting the keeper to the body member and extending through the fastener opening;
a biasing member disposed between the keeper and the body member on the threaded fastener; and
a counterbore extending coaxially around the fastener opening receiving a first end of the biasing member.

17. A clamp assembly, comprising:
a body member having first and second ends;
a cable groove formed in the body member between the first and second ends thereof to receive a conductor;
a keeper connected to the body member to engage the conductor received in the cable groove;
a nut positioned in a portion of the keeper having a shape corresponding to the nut to substantially prevent rotational and axial movement of the nut therein;
a threaded fastener connecting the keeper to the body member;
a biasing member biasing the keeper away from the body member; and
a washer on the fastener abuting a substantially V-shaped outer surface of the body member.

18. The clamp assembly of claim 17, wherein
the biasing member includes a coil spring.

19. The clamp assembly of claim 18, wherein
a first end of the coil spring abuts the body member and a second end abuts the nut.

\* \* \* \* \*